March 1, 1955     J. G. COUSER     2,703,165
LOAD CONVEYING ROLLER
Filed Nov. 19, 1953

INVENTOR.
James G. Couser
BY Louis Chayka
ATTORNEY.

2,703,165

LOAD CONVEYING ROLLER

James G. Couser, Detroit, Mich., assignor to Cougar Engineering Company, Detroit, Mich., a corporation of Michigan Application November 19, 1953, Serial No. 393,063

3 Claims. (Cl. 193—37)

The rollers to which my improvement pertains are of the type employed as a means for support of heavy or bulky objects which are to be moved from one location to another in the course of the construction or some operation thereon. More specifically, the rollers are to be employed in cases where it is important that the surface portion of the objects be cushioned to prevent impact against hard surfaces and to save said surfaces from abrasive friction, both of which eventualities might damage the finish of the object.

The rollers of this type being already in use include a yieldable rubber member forming the outer portion thereof, said rubber member being permanently joined to a metal shaft or core which forms the axial part of the roller. When the rubber member has been worn out or torn, the whole roller had to be discarded. As this practice was uneconomical, and as the metal core which was so discarded ordinarily included ball bearings and a number of machined parts, it is the object of my improvement to provide a roller including a removable rubber member which alone would be discarded and which would be substituted by another rubber member adapted to be mounted on the same metal core.

A further object of my improvement is to provide a roller in which the rubber member has the shape of a gear wheel, the teeth of the wheel being disposed crosswise to the rim thereof. While this is the normal tooth formation in gears, known as straight spur gear variety, it is an innovation in rollers of the type discussed herein, the innovation having certain advantages which I shall name in the course of these specifications.

I shall now describe my improved roller with reference to the accompanying drawings in which.

Similar numerals refer to similar parts throughout the several views.

Figure 4:
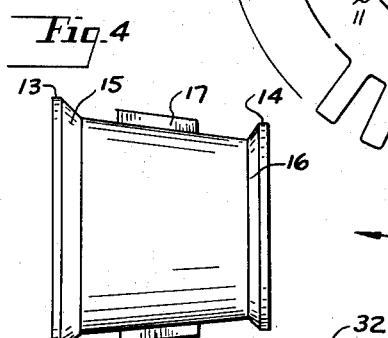
Fig. 4 is a side elevational view of the metal core of the roller, the complete roller including a rubber outer member movably seated upon said core.

The shape of the core which is generally identified by numeral 10 is substantially that of a truncated cone. As the roller in its operative use is to be disposed horizontally, or substantially so, one end 11 of the core, specifically the end of the larger diameter, will be called herein the rear of said core, while its opposite end, smaller in diameter, will be called the front end thereof. At each end the core includes a flange, the flange at the rear end being marked 13 and the flange at the front end being marked 14, the opposed faces of the flanges being marked 15 and 16, respectively, and slanting towards each other as best shown in Fig. 4.

Radially projecting from the body of the core, midway its flanges and in a spaced relation thereto, are a plurality of ribs 17. The ribs may be integrally formed with the body of the core or they may be formed of short bars and inserted into slots 18 in the body of the core, as shown in the drawings. The body of the core is provided with an axial bore 19 of uniform diameter along its length, excepting its end portions which are recessed as shown at 20. Each of the end portions contains within its recess an annular race 21 for engagement with a plurality of balls 22, the balls being kept in place by the inner race 23, and constituting with both said races a conventional ball bearing mechanism. Fitted axially into each inner race 23 is a bushing 24.

Figure 1:
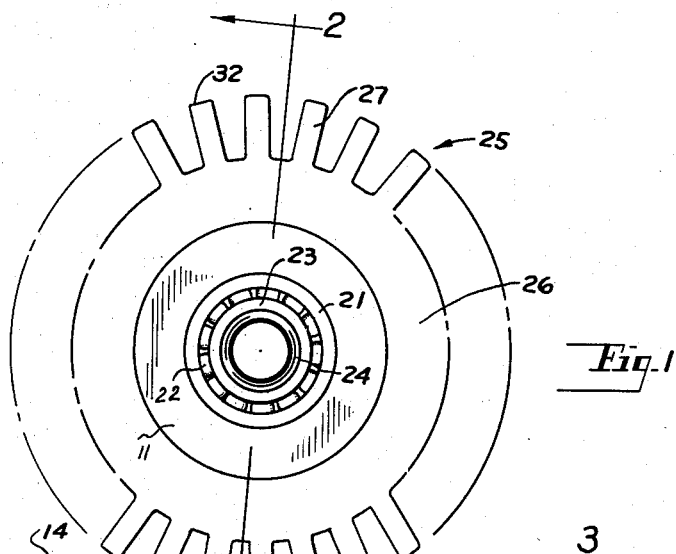
Fig. 1 is a front elevational view of the roller.
Figure 2:
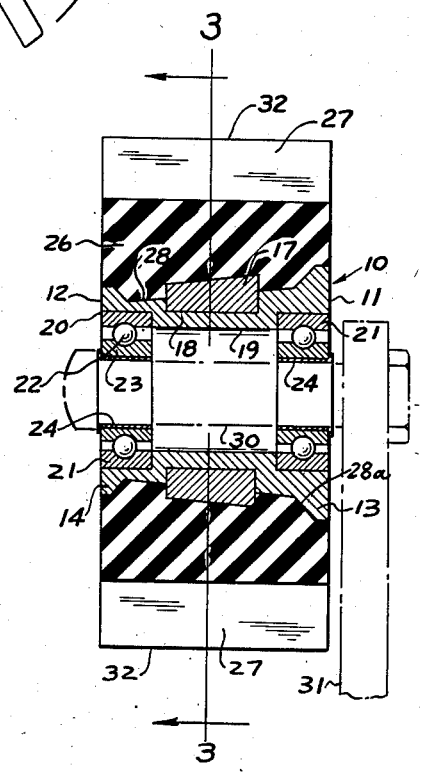
Fig. 2 is a sectional view on line 2—2 of Fig. 1, the view including a dotted outline of a bracket and shaft upon which the roller is mounted.

Adapted to be mounted upon said core is a member generally indicated by numeral 25. The member has the shape of a gear wheel and includes a hub 26 and a plurality of integrally-formed teeth 27 extending radially from the hub and disposed transversely to the thickness of the hub, as shown in Figs. 1 and 2.

The hub is provided with an axial aperture tapered as shown at 28 to correspond to the outer tapered surface of the core 10, and is recessed at each end, as shown at 28a, to fit over the flanges 13 and 14, respectively, of said core. In addition thereto, said hub is provided with a plurality of radial slots 29 extending into the body of the hub radially from said axial aperture for engagement with ribs 17 on said metal core 10.

Figure 3:
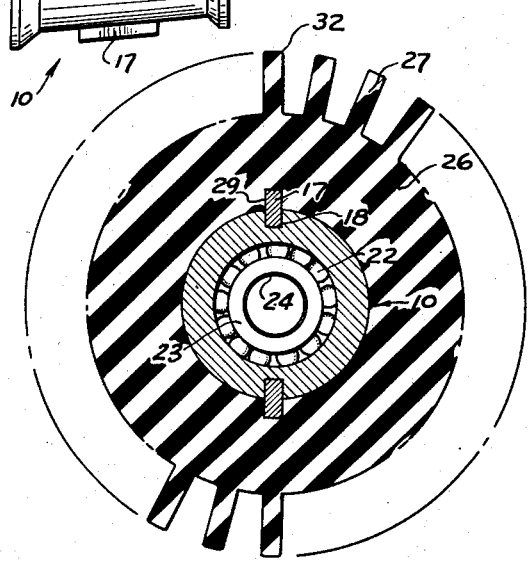
Fig. 3 is a sectional view on line 3—3 of Fig. 2.

For the purposes contemplated by me, said member 25 is to be made of rubber, must have sufficient firmness to support a load thereon. It also must be flexible to provide a cushioning support for the load and to be flexible enough to permit temporary stretching of the portions of the hub surrounding the axial aperture therein. This is in order that the hub may be forced over the flange 14 at the front of the core for an axial mounting thereon. The mounting must be effected in such a manner that the ribs 17 of the core will fit into slots 29 in the hub portion of said member 25. The position of the rubber member 25 upon said core is best shown in Figs. 2 and 3.

It will be understood that for operative use the rollers are supported on shafts projecting from suitable standards or brackets. This is shown in Fig. 3 where a horizontal shaft 30 projects from a vertical standard 31.

The load, when placed on a plurality of rollers, moves transversely to the respective shafts, that is, crosswise to the length of individual teeth of the rubber member. This arrangement, the applicant believes, will materially reduce the wear of the teeth and their liability of being cut by sharp edges of any of the load.

When the rubber part of the roller has been worn out by use, it is simply pulled off the core and a new rubber member is forced upon the core in its place.

After having described by improvement, what I wish to claim is as follows:

1. A load-conveying roller comprising a metal core in the form of a truncated cone, the cone being provided with a plurality of radially-projecting ribs, and a removable rubber member in the form of a gear wheel, the member having a tapered axial aperture for a fit over the body of the core and having a plurality of recesses opening into its body radially from said radial aperture for engagement with said ribs.

2. A load-conveying roller comprising a metal core in the form of a truncated cone, the core being provided with an axial opening permitting the core to be mounted upon a shaft for rotation thereabout, said core having an annular flange at each end and a plurality of radial projections intermediate said flanges, and a rubber member adapted to be removably mounted upon said core, the member having the shape of a gear wheel the teeth of which are disposed parallel to the axis of the roller, said rubber member being further provided with a tapered axial aperture to fit axially over the core intermediate said flanges and with a plurality of recesses radially extending into its body from said axial aperture for engagement with said ribs.

3. A roller as described in claim 2 wherein the diameters of the axial aperture in the rubber member at its respective ends are smaller than the diameters of the respective flanges adjoining said ends.

References Cited in the file of this patent

UNITED STATES PATENTS

| | | |
|---|---|---|
| 980,523 | Heimer | Jan. 3, 1911 |
| 2,072,297 | Damm | Mar. 2, 1937 |
| 2,572,276 | Moe | Oct. 23, 1951 |
| 2,592,581 | Lorig | Apr. 15, 1952 |